Figure 1:
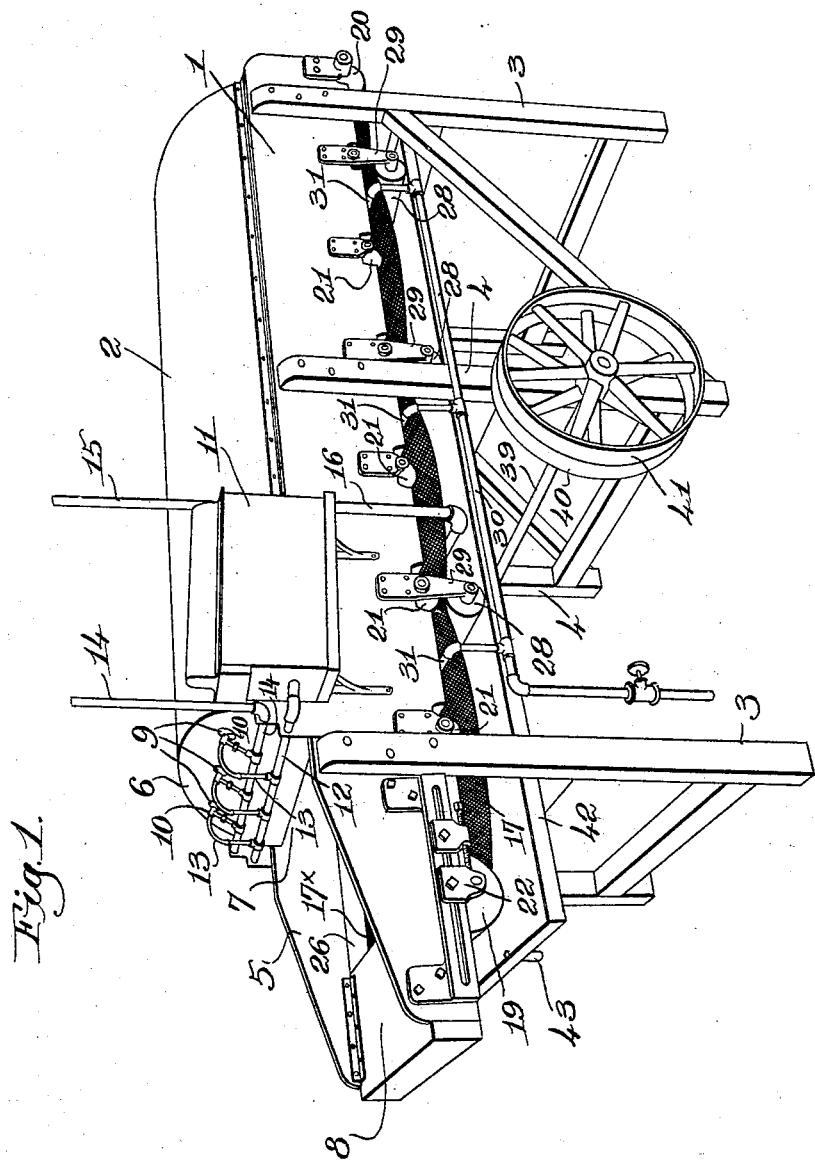

H. F. STRAW.
APPARATUS FOR MOISTENING FILLING.
APPLICATION FILED APR. 2, 1908.

910,602.

Patented Jan. 26, 1909.

2 SHEETS—SHEET 1.

Witnesses.
Thomas J. Drummond
Joseph M. Ward.

Inventor.
Herman F. Straw,
by Crosby Gregory
Attys.

H. F. STRAW.
APPARATUS FOR MOISTENING FILLING.
APPLICATION FILED APR. 2, 1908.
910,602.
Patented Jan. 26, 1909.
2 SHEETS—SHEET 2.
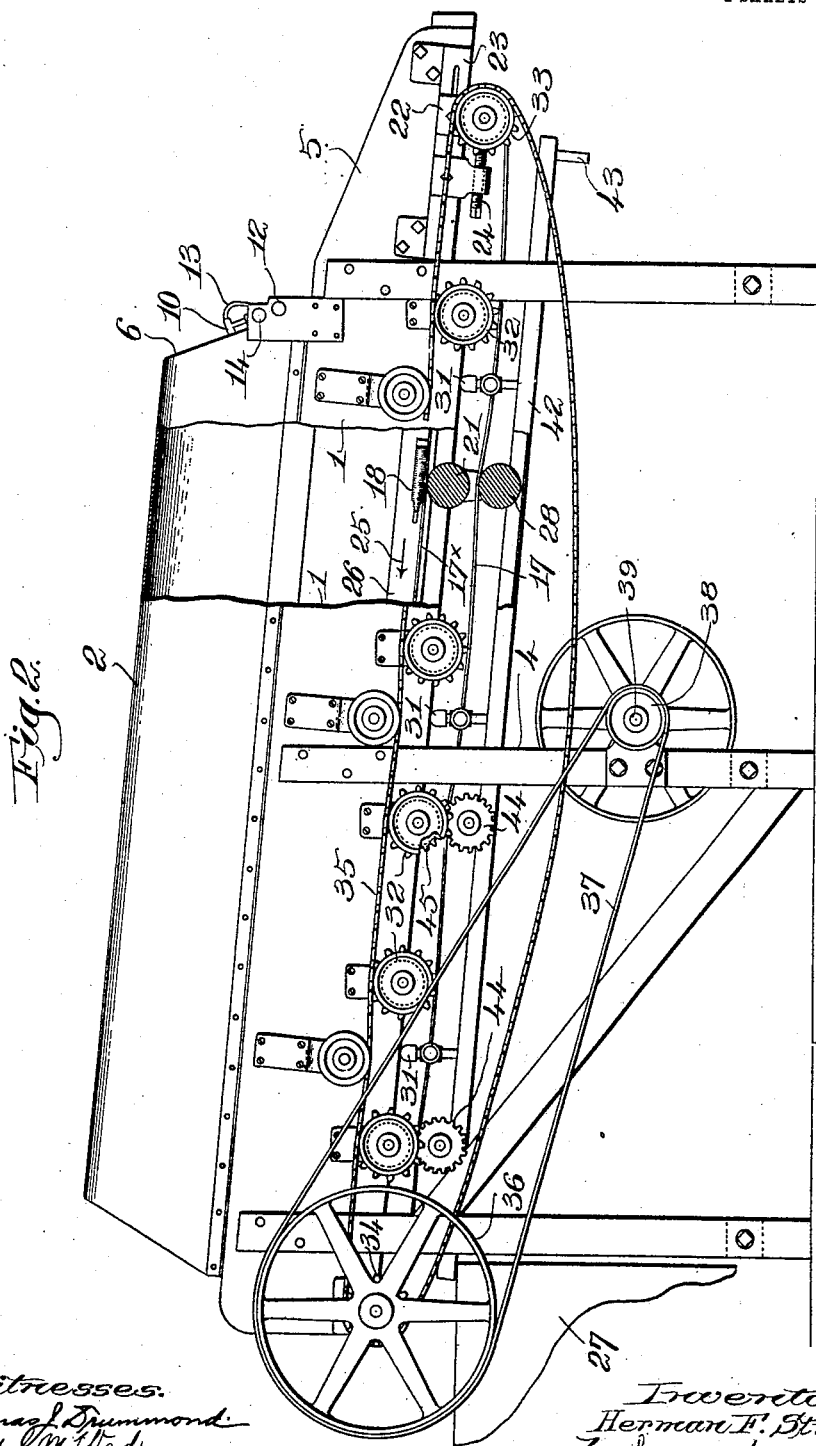

UNITED STATES PATENT OFFICE.

HERMAN F. STRAW, OF MANCHESTER, NEW HAMPSHIRE.

APPARATUS FOR MOISTENING FILLING.

No. 910,602.   Specification of Letters Patent.   Patented Jan. 26, 1909.

Application filed April 2, 1908. Serial No. 424,712.

*To all whom it may concern:*

Be it known that I, HERMAN F. STRAW, a citizen of the United States, and resident of Manchester, county of Hillsboro, and State of New Hampshire, have invented an Improvement in Apparatus for Moistening Filling, of which the following description, in connection with the accompanying drawing, is a specification, like letters on the drawing representing like parts.

This invention has for its object the production of simple apparatus for efficiently and quickly moistening filling yarn when wound upon bobbins, in order that the filling may operate properly in the weaving operation.

It is well known that if not moistened filling retains for a long time the kinky tendency due to its twist, and in being woven kinks are often drawn into the cloth, damaging the same and causing imperfections known as "kinky filling", a very serious and common cause of damaged goods. The so-called "aging" of filling to obviate this difficulty is usually accomplished by keeping the filling in a warm super-saturated atmosphere for several hours, or even days, at a time. By my invention the aging effect is accomplished with a single and very short, simple treatment.

In aging filling by the usual methods the wooden bobbins, from long exposure to the moisture, are apt to shrink, warp and deteriorate, while by means of my invention the exposure of the bobbins to the action of the moisture is so brief, and the reëvaporation of whatever moisture is deposited on or inside the bobbins is so rapid and complete that the bobbins last much longer, eliminating a considerable expense account for new bobbins.

As will appear hereinafter I have provided means whereby a very thorough moistening of the filling masses is effected before they are brought into use in the loom, so that the humidity of the weave shed need not be so carefully watched nor maintained at such a high point as is now customary.

In the apparatus embodying my invention the yarn masses are fed into a closed chamber and carried therethrough by a suitable endless traveler, the atmosphere within the chamber being kept warm and charged with the required amount of moisture, so that in their passage the yarn on the filling-carriers or bobbins will be thoroughly moistened, but without injuring the bobbins themselves.

The various novel features of my invention will be fully described in the subjoined specification and particularly pointed out in the following claims.

Figure 1 is a perspective view of a filling moistening apparatus embodying one form of my invention; Fig. 2 is an opposite side elevation thereof, with a part of the side and top of the chamber broken out.

In the present embodiment of my invention an elongated chamber, formed by parallel side walls 1 and a hood-like cover or top 2, is mounted on suitable supports or legs 3, 4, shown as located at the ends and about the center of the chamber, respectively. The sides are prolonged at the inlet end of the chamber, at 5, leaving below the end 6 of the hood an end opening 7, Fig. 1, to the chamber, the prolongations 5 being connected at their outer ends by a flat table or rest 8. As herein shown the end 6 of the hood has a series of openings 9 through which sprays of finely pulverized water are introduced into the chamber, by means of suitable vaporizers 10. These vaporizers may conveniently be such as shown in United States Patent No. 869945, granted November 5, 1907, to A. W. Thompson, the water being conducted from a constant level tank 11 by a pipe 12 having branches 13 connected with the vaporizers, the fluid under pressure, which may be compressed air or steam, being supplied through branches from the main supply pipe 14, Fig. 1. In practice the tank 11 will be provided with a suitable float-controlled or other device to maintain the water level constant, this forming no part of my invention, the main water supply pipe 15 leading to the tank, which also has an overflow 16. By means of the vaporizers a strong current of moist air is introduced to and traverses the chamber from end to end, maintaining therein an atmosphere of such humidity that any objects exposed thereto will be thoroughly impregnated with moisture.

I regard the location of the vaporizers at one end of the chamber to be highly important in securing the desired results by my apparatus. The vaporizers are in fact humidifiers, and are used to create a supersaturated atmosphere in the chamber, and not for the purpose of spraying or sprinkling moisture directly upon the yarn; in other words the vaporizers are not sprinklers. In order to insure a proper circulation and distribution of this supersaturated atmosphere within the chamber I deem it to be of great importance to locate the vaporizers at one end of the hood, as described, for otherwise there would be little or no circulation and a relatively dead atmosphere would result, with a material decrease in the efficiency of the apparatus.

In order to effect a gradual movement of the material, such as bobbins filled with yarn, through the chamber I provide an endless foraminous or perforated carrier 17 preferably made of metal, and of the requisite flexibility, the bobbins 18 being sustained on upper run 17$^\times$ of the carrier, see Fig. 2. This carrier is sustained at the ends of the chamber by rolls 19, 20, preferably of wood, journaled in suitable bearings on the chamber, the upper run 17$^\times$ being supported at intervals by a series of metallic rolls 21 also journaled on the sides of the chamber. The journals of the roll 19 are shown as mounted in adjustable bearings 22 slidable on guides 23 secured to the extensions 5 and maintained in position by screws 24, so that the carrier may be tightened or slackened as may be necessary. The roll 19 and adjacent end of the upper run of the carrier is overhung by the table or rest 8, Fig. 1, so that the bobbins can be pushed off the latter onto the carrier as the latter is moved, as will be explained, the upper run 17$^\times$ traveling in the direction of arrow 25, Fig. 2.

Metallic guard-plates 26 are secured to the sides 1 and extensions 5 opposite the edges of the upper run of the carrier, to prevent undue wear and also serving to keep the run in proper position laterally as it is moved along the chamber.

As the bobbins leave the outlet end of the chamber, passing over the roll 20 they drop therefrom into a suitable box or other receptacle, partly shown at 27, Fig. 2, by means of which they can be removed in bulk to the weave shed.

The lower run of the carrier is supported at intervals by preferably metallic rolls 28 suitably journaled in depending hangers 29.

A steam supply pipe 30, Fig. 1, extended along the side of the apparatus is provided with a series of transverse, perforated branches 31 extended from one to the other side of the chamber below the upper run of the carrier, and in practice the perforated branches serve to discharge warm moist vapor into the chamber, such vapor passing up through the upper run of the carrier and permeating the filling masses thereon, the steam heat raising the temperature of the atmosphere under the hood to hasten and facilitate the absorption of the moisture by the yarn.

From the foregoing it will be seen that the atmosphere in the chamber is maintained warm and moist, the degree of warmth and humidity being easily regulated by the vaporizers and the steam discharge pipe. The yarn masses as they traverse the chamber become thoroughly and evenly moistened to the required extent, a very great uniformity being secured inasmuch as each mass of filling is equally subjected to the action of the moist, warm air for the same length of time.

The metallic rolls which support and drive the carrier, the carrier itself, and the metal exposed to the action of the moist air within the chamber will be made of copper, brass, or other non-corroding metal.

I will now describe means for conveniently effecting the positive rotation of the rolls.

Referring to Fig. 2 each of the rolls 21 has one of its journals extended to receive a sprocket wheel 32, and similar sprocket wheels 33, 34 are secured to the journals of the rolls 19 and 20 respectively, said wheels being engaged by an endless sprocket chain 35, which drives along its upper run, as shown, the lower run hanging slack. A large belt pulley 36 secured to the journal of roll 20 receives a belt 37 driven by a small pulley 38 on a shaft 39 mounted in suitable bearings on the supports 4, said shaft being provided with suitable fast and loose pulleys 40, 41, Fig. 1, to which power is transmitted by a suitable belt, not shown, from any suitable source of power. The speed of the driving chain 35, and consequently of the rolls 21, is reduced by belting from the small pulley 38 to the large one 36, as shown, so that the carrier is moved slowly along, giving ample time for the yarn masses to absorb the requisite moisture in their passage through the chamber.

I have found that a chamber about ten feet long and slightly over three feet wide will give excellent results, such chamber with its hood containing a large volume of the warm, and moist air, though I do not limit myself to such dimensions.

As best shown in Fig. 2 the upper run of the carrier is slightly inclined from the inlet to the outlet end of the chamber, a drip pan 42 being placed under the carrier from one to the other end thereof, to collect any condensation water as it forms, the slope of the pan being sufficient to cause the water collected to travel to the lower end, from which it may be removed at an outlet 43.

I prefer to positively drive the rolls 28 which sustain the lower run of the carrier, to reduce wear and prevent any dragging action, and for this purpose the rolls 28 have attached gears 44 which mesh with like gears 45 on the journals of the adjacent rolls 21, the rolls 28 being thereby rotated positively and at the same speed as the rolls 21 but in the opposite direction. As there is no load on the lower run of the carrier it is unnecessary to use as many supporting rolls as for the upper run, and herein I have shown only three of the rolls 28.

It will be seen from an inspection of Fig. 2 that all of the mechanism for imparting rotation to the various rolls, to drive the carrier, is located outside the moistening chamber, in a readily accessible position, and that there is nothing within the chamber to interfere with the smooth and uninterrupted passage of the yarn masses therethrough.

In apparatus heretofore designed for moistening yarn, so far as I am aware, the moisture has been introduced by means of sprinklers, which merely wet the surface of the yarn by sprinkling thereupon water in a spray form, and as a consequence the bobbins are discharged with the yarn masses merely wet on the surface, or for a very slight distance inward from the surface, while the exposed portions of the wooden bobbins are thoroughly wet. The water which, in the form of water, is sprinkled upon the yarn masses must afterwards be absorbed more or less slowly imperfectly, and unequally. In my apparatus, however, I create in the chamber a supersaturated atmosphere, i. e., a humidity of practically 100 per cent., supplemented by moisture in suspension in the form of fog. Furthermore, by means of the steam I increase the temperature, the moisture from the steam at the same time tending to prevent the deficit of moisture which otherwise would result from the rise in temperature. The yarn at the temperature of the room in which the apparatus is located enters the inclosed chamber and is exposed to the atmosphere above specified. Owing to the difference in temperature between the yarn and the atmosphere in the chamber some condensation must at once occur in addition to the moisture directly deposited by the fog. This occurs not only on the surface of the yarn but also well below the surface, stimulated by the lower temperature of the inner layers of yarn in the yarn masses. Consequently the yarn masses leave the apparatus warm and damp instead of being merely wet on the surface, as has been the case heretofore.

By my apparatus I accomplish in a few seconds precisely what the ordinary process of so-called "aging" requires from two to three days to accomplish in a warm, damp room, and with my apparatus the operation is so rapid that the wooden bobbin has no time to absorb moisture. The bobbins deteriorated rapidly by warping and shrinking in the old process because of the alternate periods of drying and dampening to which they were subjected, whereas by the apparatus herein described this trouble is completely and wholly avoided, as shown by actual results in practice.

My invention is not restricted to the precise construction and arrangement herein shown and described, as the same may be modified or rearranged in different particulars without departing from the spirit and scope of my invention as set forth in the annexed claims.

Having fully described my invention, what I claim as new and desire to secure by Letters Patent is:—

1. In an apparatus of the class described, an elongated closed chamber having inlet and outlet openings at its opposite ends, an endless, perforated traveling carrier extended lengthwise of the chamber to sustain upon its upper run the yarn masses to be moistened, a series of perforated steam-discharging pipes extended transversely below and adjacent the upper run of the carrier, and means to direct moistened air into the chamber above the carrier, whereby a warm, uniformly moist atmosphere is maintained and regulated in the chamber to act upon the yarn as it is moved therethrongh by the carrier.

2. In an apparatus of the class described, an elongated open-bottom chamber having inlet and outlet openings at its opposite ends, an endless, perforated traveling carrier extended lengthwise of the chamber to sustain upon its upper run the yarn masses to be moistened, a series of perforated steam-discharging pipes extended transversely below and adjacent the upper run of the carrier, means adjacent the inlet of the chamber to direct moistened air into the chamber above the carrier, whereby a warm, moist and supersaturated atmosphere is maintained substantially uniform in the chamber to act upon the yarn as it is moved therethrough by the carrier, and a drip pan located below the carrier to collect water of condensation formed in the chamber.

3. In an apparatus of the class described, an elongated chamber having inlet and outlet openings at its opposite ends, an endless, perforated traveling carrier extended lengthwise of the chamber to sustain upon its upper run the yarn masses to be moistened, a series of perforated steam-discharging pipes extended transversely below and adjacent the upper run of the carrier, a series of vaporizers located at one end and above the inlet of the chamber, and supplies of water and of fluid under pressure operatively connected with the vaporizers, the latter directing moistened air to the chamber above the carrier and creating and distributing throughout the chamber a supersaturated and substantially uniform atmosphere.

4. In an apparatus of the class described, an elongated closed chamber having inlet and outlet openings at its opposite ends and an open bottom, an endless, perforated traveling carrier extended lengthwise of the chamber at the open bottom thereof to sustain upon its upper run the yarn masses to be moistened, means at or near the bottom of the chamber to warm the contents of the chamber, and means to continuously introduce moistened air into and circulate it throughout the chamber above the carrier whereby a moist, warm atmosphere is maintained in the chamber.

5. In an apparatus of the class described, an elongated closed chamber, an endless, traveling, foraminous carrier therein to sustain upon its upper run the material to be moistened, means to introduce jets of moist air into the chamber at one end thereof above the carrier, and steam inlets located at intervals below the upper run of the carrier, to direct steam through the upper run into the chamber and raise the temperature thereof.

6. In an apparatus of the class described, an elongated chamber closed at its sides and top and having inlet and outlet openings at its ends, an endless foraminous carrier therein to sustain upon its upper run filling masses to be moistened, separate and positively driven series of rolls to sustain and effect longitudinal movement of the upper and lower runs of the carrier, respectively, means to introduce at one end of the chamber and above the carrier water in finely pulverized condition, and means to maintain the moist air within the chamber at desired temperature.

7. In apparatus of the class described, an elongated covered chamber, an endless, foraminous carrier longitudinally movable therein, to support and carry through the chamber the yarn masses to be moistened, means to direct moist air to the chamber at its inlet-end above the carrier, and steam inlets located below the upper run of the carrier, the yarn masses being placed on the carrier at one end of the chamber and discharged automatically from the carrier at the opposite end of the chamber, combined with separate sets of rolls to support the upper and lower runs, respectively, of the carrier, and means to positively rotate the rolls of the separate sets, in opposite directions, whereby both runs are positively driven.

In testimony whereof, I have signed my name to this specification, in the presence of two subscribing witnesses.

HERMAN F. STRAW.

Witnesses:
ARTHUR A. SHAFTER,
ELIZABETH R. MORRISON.